Dec. 17, 1940.  R. E. BASSETT, JR  2,225,144
MULTIPLE SPEED ELECTRIC MOTOR
Filed Feb. 23, 1937  2 Sheets-Sheet 1

Inventor:
Rex Earl Bassett Jr.
By Williams, Bradbury,
McCaleb & Hinkle
Attys.

Dec. 17, 1940.   R. E. BASSETT, JR   2,225,144
MULTIPLE SPEED ELECTRIC MOTOR
Filed Feb. 23, 1937   2 Sheets-Sheet 2
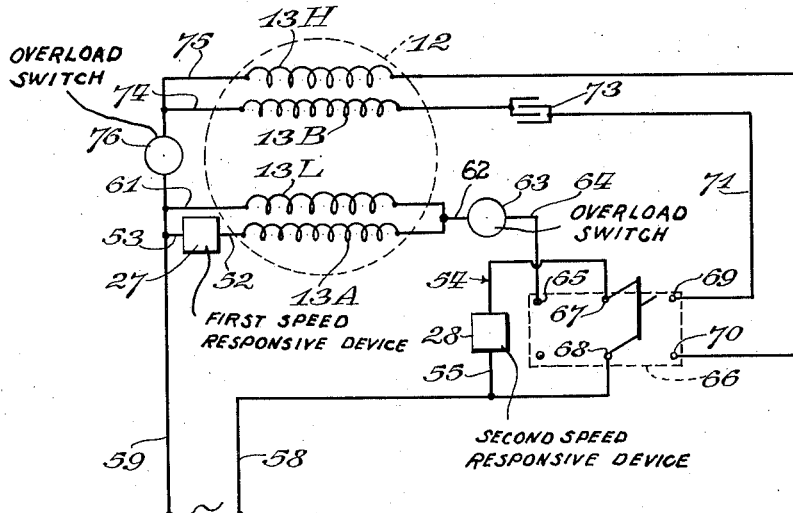
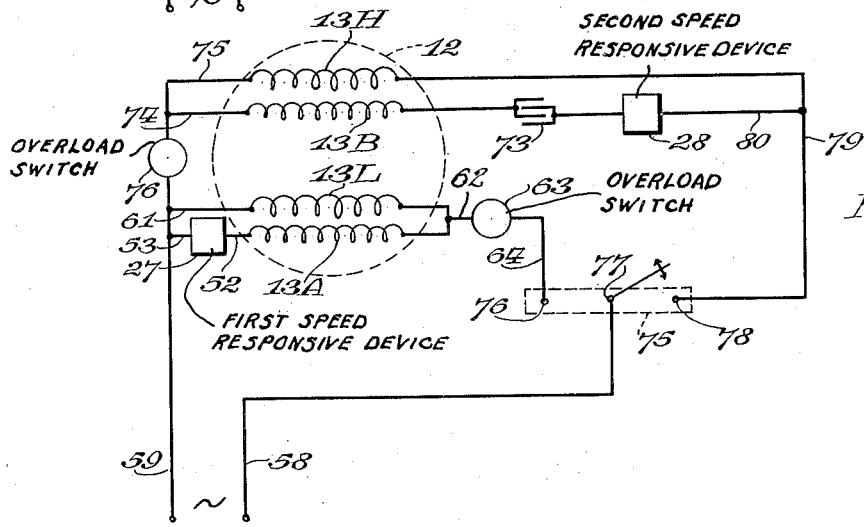
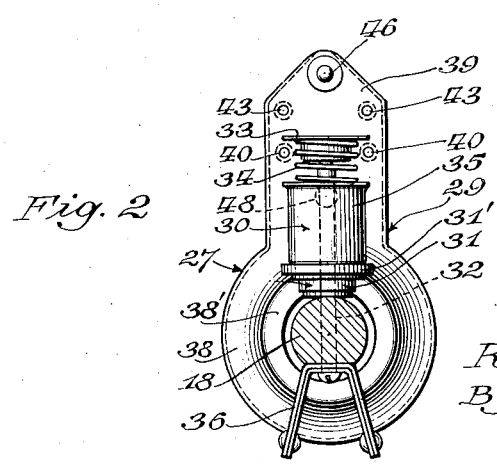
Inventor:
Rex Earl Bassett, Jr.
By Williams, Bradbury,
McCaleb & Hinkle.
Attys.

Patented Dec. 17, 1940

2,225,144

UNITED STATES PATENT OFFICE 2,225,144

MULTIPLE SPEED ELECTRIC MOTOR

Rex Earl Bassett, Jr., South Bend, Ind., assignor to Bendix Home Appliances, Inc., Detroit, Mich., a corporation of Delaware Application February 23, 1937, Serial No. 127,191

10 Claims. (Cl. 172—279)

My invention relates to alternating current motors, and particularly to multiple-speed single-phase induction motors. In spite of the well known advantages of the polyphase motor over the single-phase motor, it is frequently necessary to install small motors so far from the polyphase power source that it is uneconomical to run three wires to the motor when two will suffice. Thus alternating current induction motors for driving such loads as fans, sewing machines, and washing machines must usually be supplied from lighting circuits which are single-phase. To be useful for such purposes the single-phase induction motor which possesses no starting torque must be made self-starting and such starting has been accomplished, among other well known methods, by the split-phase method. According to this method the motor is supplied with an auxiliary winding in space quadrature with the main winding that is cut out of the circuit automatically by a centrifugal device upon attainment of a predetermined speed.

In some applications it is necessary to operate apparatus at a plurality of speeds, and a ratio as high as 5 to 1, or higher, may be desired for two operating speeds.

For various reasons, among which may be included the difficulty of starting single-phase motors and the unavailability of satisfactory multiple-speed single-phase induction motors, various gear shifting arrangements have heretofore been used to obtain multiple speed operation of the driven member.

It is the primary object of my invention to provide a new and improved multiple-speed single-phase alternating current motor and thereby eliminate the necessity of using gear shifts and other mechanical speed-changing devices with their attendant noise.

A further object of my invention is to provide a new and improved multi-speed single-phase alternating current induction motor adapted directly to drive a driven member at a plurality of widely varying speeds.

More particularly, it is an object of my invention to provide an alternating current motor having means for operating the same at a plurality of speeds and having a plurality of torque increasing means each associated with the means for operating said motor at a predetermined one of said plurality of speeds.

Another object of my invention is to provide speed responsive means for controlling the energization of each of said torque increasing means.

Briefly, the above enumerated objects of my invention are accomplished by providing a motor to be operated at two speeds with a pair of selectively energizable low and high speed running windings, as by providing the motor with independent windings producing a different number of poles or obtaining a similar result by a regrouping of the coils, and a pair of starting windings in space quadrature with the aforesaid windings. When the motor is started the low speed running winding is energized concurrently with its associated starting winding and, as the motor speed attains a value near its lower running speed, the starting winding is deenergized by an associated speed responsive device. Thereafter, if it is desired to operate the motor at the higher speed, the low speed winding is deenergized and the high speed running winding and its associated starting winding are energized to produce a greater starting torque sufficient to build the motor speed up to a point where the high speed running winding is alone sufficient to maintain the motor in operation. Upon attainment of a predetermined higher speed near the normal high speed, a second speed responsive device deenergizes the high speed starting winding.

A still further object of my invention is to provide the motor with means for preventing energization of the low speed running winding when the motor speed is above a predetermined value. In case the motor has been operating at high speed and the low speed winding were to be energized before the motor speed decreases to a value near normal low speed, there would be produced a dynamic braking effect which creates a loud noise and which might severely strain the driven apparatus and deleteriously affect the power supply circuit. Preventing energization of the low speed winding when the motor speed is considerably in excess of normal low speed avoids these undesired effects.

These and other objects of my invention will become apparent from the ensuing description, in which reference is had to the accompanying drawings illustrating a preferred embodiment of the invention and a modification thereof.

Referring to the drawings:

Figure 2 is a transverse section along lines 2—2 of Figure 1;

Figure 3 is a wiring diagram for the motor of Figure 1; and

Figure 4 is a modified wiring diagram.

Figure 1:
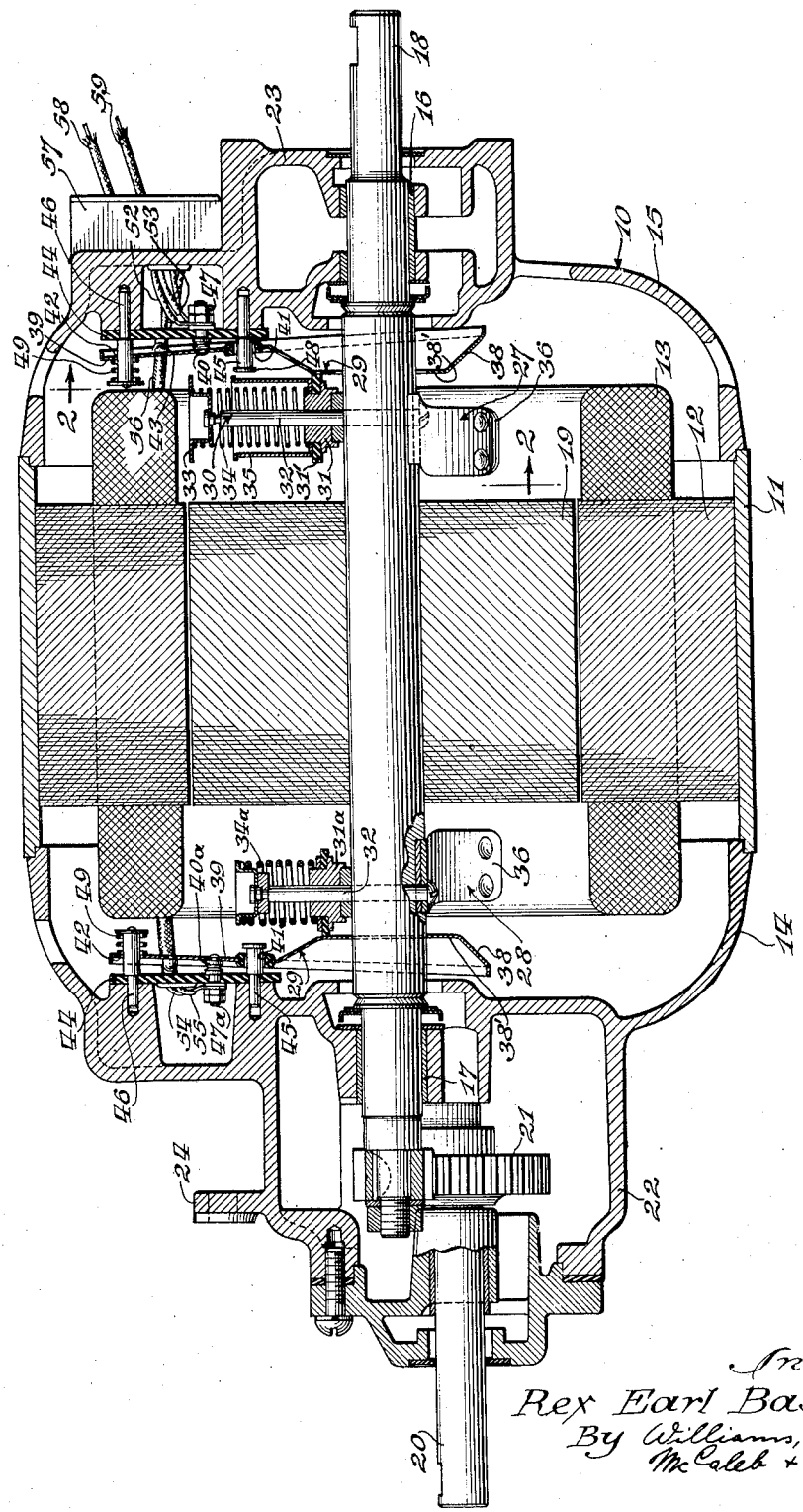
Figure 1 is an axial section through a multiple-speed single-phase alternating current induction motor embodying my invention.

In Figure 1 reference numeral 10 indicates an alternating current motor comprising a well known type of annular motor frame 11 within which is mounted an annular laminated stationary armature 12, carrying armature windings 13 to be described more fully hereinafter. Fastened to the motor frame by suitable means (not shown) are a pair of end plates or bells 14 and 15 formed with integral bearing supports mounting bearings 16 and 17, in which is journaled a rotatable shaft 18. On the shaft is mounted a rotor 19 of the well known squirrel cage type.

The motor drives a shaft 20 through reduction gearing 21 mounted within a combined gear case and bearing housing 22 formed integrally with the end plate 14. The combined gear case and bearing housing 22 and bearing housing 23 are so designed that they may be filled with lubricating oil at the plant during the assembly of the motor, and may then be shipped in any position without the loss of oil. The motor is adapted to be attached to any suitable support by means of a bracket 24 formed on the gear case 22.

As will be described more fully hereinafter, the winding 13 comprises windings for operating the motor at a plurality of speeds and a plurality of starting windings in space quadrature with respect to the running windings. These windings are controlled by a pair of speed responsive devices 27 and 28 of the centrifugal type. The speed responsive device 27, which is illustrated more fully in Figure 2, consists of a switch member 29 and a centrifugally actuated switch actuating device 30. The latter comprises a relatively heavy weight 31 slidably mounted upon a rod 32 extending through and rigidly fastened to the shaft 18. Movable with the weight is an annular disc 31' of insulating material, adapted to actuate the switch member 29. Securely fastened to the outermost end of the rod 32 is a flanged cup-shaped member 33 slidably mounted for limited movement on the rod and adapted to bear against a relatively light coil spring 34. The cup-shaped member 33 is adapted to be engaged by a second cup-shaped 35 surrounding a portion of the spring and extending toward the member 33 so that outward movement of the weight 31 in response to motor speed is restricted to a predetermined amount.

Ventilation for the motor windings and a means for balancing the rotor is provided by a V-shaped member 36, the wing portions of which may be bent and which is secured to the shaft by the rod 32.

The switch member 29 consists of a metal stamping having a substantially annular truncated conical portion 38 with an inwardly extending flange 38' surrounding the motor shaft and adapted to coact with the centrifugally operated weight 31 and a relatively long flat vertically extending portion 39 carrying a pair of movable contacts 40 across which a circuit is closed under predetermined conditions, and provided with a pair of openings 41 and 42. The flat portion 39 is also provided with a pair of knob-like protuberances 43 adapted under predetermined conditions to engage a block 44 of insulating material attached to the motor frame by a pair of studs 45 and 46 extending through the openings 41 and 42 on the flat portion. The block 44 also mounts a pair of stationary terminals 47 (only one of which is shown) cooperating with the movable contacts 40. The stud 45 is provided with a flanged head 48 for restricting movement of the switch member in a clockwise direction about the knobs 43 which act as a fulcrum when the weight moves radially outward a predetermined amount sufficient to permit actuation of the switch member by a spring 49 mounted on the stud 46 and biasing the switch member in the clockwise direction. The constant of the spring 34 and the size of the cup 35 are designed in accordance with well known principles so that the switch mechanism operates to close the contacts 40 and 47 at speeds below approximately 350 R. P. M. and to open the contacts at speeds above this value for reasons to appear more fully hereinafter.

The construction of the speed responsive means 28 is substantially the same as that of 27 and will not be repeated except in so far as it differs from the latter. It may be noted from Figure 1 that the spring 34a of speed responsive means 28 is considerably heavier and shorter than spring 34, and that the cup 35 has been omitted. Instead of operating at substantially the same value on both increasing and decreasing speed, the speed responsive device 28 is adapted to close its associated contacts 40a and 47a at speeds below 1000 R. P. M. and to open these contacts at speeds above 2000 R. P. M. Also, for reasons to appear more fully hereinafter, the motion limiting cup 35 of device 27 prevents complete compression of the spring 34 so that the latter returns the weight 31 upon deceleration to the innermost position at a speed only slightly below the speed at which the weight moves outwardly during acceleration, thereby to operate the switch 29 at a very small speed differential. The omission of the cup from device 28 permits the spring 34a to be compressed to a greater extent so that once the weight 31a is operated to its outer limit of movement at a speed, as assumed, of 2000 R. P. M. the spring tension is not sufficient to return the weight against the centrifugal force until the speed decreases to 1000 R. P. M. These speed responsive devices themselves form no part of my invention and any other well known types may be used.

The electrical connection of the centrifugally operated switches 27 and 28 with the motor and circuit windings has been illustrated only diagrammatically in Figure 1. A pair of conductors 52 and 53 connect the centrifugally operated switch mechanism 28 in circuit with the remainder of the apparatus, and a pair of conductors 54 and 55 similarly connect the centrifugally operated switch mechanism 27 in circuit. The conductors 52 to 55, inclusive, and a plurality of diagrammatically illustrated conductors 56 extend to a connection and control box 57 attached to the end plate 15. A pair of conductors 58 and 59 extend from the control box for connection to any suitable source of single-phase alternating current.

Referring, now, to Figure 3, in which is illustrated the wiring diagram of a preferred embodiment of my invention, there is diagrammatically illustrated the armature 12 containing a plurality of windings 13A, 13B, 13L, and 13H, corresponding respectively to the low speed starting winding, the high speed starting winding, the low speed running winding, and the high speed running winding. The running windings are illustrated as independent windings, each providing a different number of poles, for instance, ten and two, so that the synchronous speeds of the induction motor are 720 and 3600 R. P. M. While I have disclosed independent running windings, it is obvious to those skilled in the art that the independent low and high speed windings may be replaced by an arrangement wherein the different number of poles are obtained by a suitable regrouping of the stator coils.

The starting windings 13A and 13B are located in space quadrature with respect to the running winding in order to provide the starting torque necessary to initiate operation of the motor and also enable it to be changed from low to high speed operation.

From Figure 3 it may be noted that the low speed starting winding 13A is connected by the previously described conductor 52 to the low speed centrifugally operated device 27 and that the latter is in turn connected by conductor 53 to supply conductor 59. The low speed running winding 13L is similarly connected by the conductor 61 to the supply conductor 59 and the opposite ends of these conductors are joined together by a conductor 62 leading to a suitable automatically reset overload protective switch 63 of any well known type. The latter is connected by a conductor 64 to a contact 65 of a double-pole, double-throw switch 66 by means of which low or high speed operation of the motor may be selectively obtained. When moved to the left the switch conditions the motor for low speed operation and when moved to the right it conditions the motor for high speed operation.

The middle contacts 67 and 68 of the switch are connected to the other supply conductor 58; the former through conductor 54, the high speed centrifugally operated speed responsive device 28 and conductor 55; the latter being directly connected thereto. The remaining contacts 69 and 70 are connected to the high speed starting and running windings 13B and 13H, respectively, by conductors 71 and 72, the former having interposed in series therewith a condenser 73 for providing capacitator type operation, as distinguished from the common split phase operation of the low speed windings. The high speed starting and running windings are connected to the supply conductor 59 at their other ends by conductors 74 and 75 through a second automatic reset overload protective switch 76.

With the circuit connections described above, low speed operation of the motor may be initiated by closing the double-pole double-throw switch 66 to connect contacts 65 and 67. This results in the simultaneous energization of the low speed starting and running windings through a circuit extending from the supply conductor 58 through the conductor 55, speed responsive device 28 in circuit closing position, conductor 54, switch 66 closing a circuit across contacts 67 and 65, conductor 64 to the automatically reset overload protective switch 63 and conductor 62 to the windings in parallel, and thence through the conductor 52, speed responsive device 27 and conductor 53 and conductor 61, respectively, to the other supply conductor 59. The energization of these windings produces a starting torque in a well known manner, and after the motor speed has reached a value of approximately 350 R. P. M. the speed responsive device 27 opens its associated contacts, thereby disconnecting the starting winding 13A from the circuit, and the motor 10 operates with the running winding 13L alone energized.

The motor operates at low speed until such time as it is either deenergized or switch 66 operated to the right for high speed operation. In case it is desired to deenergize the motor the switch 66 is opened and the previously described energizing circuit opened. Upon the motor speed reaching a value below 350 R. P. M., speed responsive device 27 recloses its contacts and conditions the circuit for further operation. If, instead of deenergizing the motor, it is desired to operate it at high speed, the switch 66 is operated from its left position to its right position, thereby closing the circuit across contacts 67 and 69 and contacts 68 and 70. It may be noted from Figure 3 that in this event the high speed running winding 13H is connected directly across the source of supply through switch 66 in its closed position and conductors 72, 75, and the automatically reset overload protective device 76. The high speed starting winding 13B is energized simultaneously through the high speed device 28, which remains closed until the speed reaches a value in excess of 2000 R. P. M. When the motor speed does reach this value the speed responsive device 28 is actuated to its open position and deenergizes the high speed starting winding 13B, and the motor operates with the high speed running winding 13H alone energized. Thereafter, if it is desired to deenergize the motor, the switch 66 is opened and the motor thereby completely deenergized.

However, in case it is desired to operate the motor at low speed after the above described high speed operation, switch 66 is operated to its left position, but the low speed windings will remain deenergized until the motor speed decreases to a value of 1000 R. P. M. or less. When the speed does decrease to this value, the speed responsive device 28 closes its associated switch and energizes the low speed running winding, the speed responsive device 27 maintaining its contacts open while the speed is above 350 R. P. M.

From the above description of the operation it may be seen that the arrangement provides a safety means preventing energization of the low speed windings until the motor speed has decreased to a value at which excessive dynamic braking effects are avoided.

In Figure 4 there is disclosed an arrangement substantially the same as that disclosed in Figure 3 with the exception that the circuit connections have been simplified. The low-speed control is identical with that described in connection with Figure 3, but the high-speed control has been changed by transferring the high-speed speed-responsive device 28 into a series arrangement with the high speed starting winding 13B. The double-pole, double-throw switch 66 has been replaced by a single-pole, double-throw switch 75 having contacts 76, 77, and 78. Conductor 64 leading to the low speed windings is connected to contact 76, supply conductor 58 is connected to the contact 77, and contact 78 is connected by conductor 79 directly to the high speed winding 13H and to the low speed winding through conductor 80, speed-responsive device 28, conductor 71, and condenser 73.

When it is desired to operate the motor at low speed, switch 75 is manipulated to the left to energize the low speed windings and the motor operates exactly as described above in connection with Figure 3. When the motor is to be operated at high speed, switch 75 is thrown to the right and the high speed starting and running windings are energized just as the low speed windings. Thus, it is apparent that the last described modification is a simplification of that disclosed in Figure 3 and one in which the motor may be operated at either one speed or another, as desired.

The above described modifications have been embodied herein merely to illustrate the fact that my invention may be variously modified, and the claims annexed thereto are intended to cover these modifications as well as others apparent to those skilled in the art.

Having thus described my invention, what I claim as new and desire to secure by Letters Patent of the United States is:

1. In an alternating current motor the combination including means connectible to a source of current for selectively operating said motor at a plurality of speeds, a plurality of starting means also connectible to said source, a predetermined starting means being rendered effective upon selection of a particular operating speed, and speed responsive means so constructed and arranged in circuit with said first mentioned means and starting means that the means operating said motor at the lowest speed cannot be energized unless the speed is approximately equal to or lower than the speed at which said means operates said motor.

2. In a single-phase alternating current motor operating system, the combination including a pair of main windings selectively connectible to a source of energy for operating said motor at high and low speeds, a pair of auxiliary windings in space quadrature to said main windings, a speed-responsive circuit-controlling device in circuit with the auxiliary low speed winding operable at a speed below the low operating speed, a second speed-responsive circuit-controlling device operable at a speed above said low operating speed, and means including a device operable into a first position and circuit connections controlled thereby placing said second mentioned device in series with the low speed windings for selecting low speed operation, whereby said second mentioned device must be in a predetermined circuit controlling position before said low speed windings can be energized.

3. In a single-phase alternating current motor operating system, the combination including a pair of main windings selectively connectible to a source of energy for operating said motor at high and low speeds, a pair of auxiliary windings in space quadrature to said main windings, a speed-responsive circuit-controlling device in circuit with the auxiliary low speed winding having a small differential of operation and operable at a predetermined value of speed, a second speed-responsive circuit-controlling device having a high differential of operation, both the limits of said last mentioned differential being above the operating speed of said first device, and means including a device operable into a first position and circuit connections controlled thereby placing said second mentioned device in series relation with the low speed windings for selecting low speed operation, whereby said second mentioned device must be in a predetermined circuit controlling position before said low speed windings can be energized, said last mentioned means also being operable into a second position wherein it directly energizes the main high speed winding and places the second mentioned speed responsive device in series with the auxiliary high speed winding.

4. In an alternating current motor the combination including means for selectively operating said motor at a plurality of speeds, a plurality of starting means, means rendering effective a predetermined starting means upon selection of each operating speed, and a plurality of speed responsive means controlling said starting means; a certain one of said last mentioned means controlling a single starting means and another controlling more than one of said two first mentioned means.

5. An alternating current motor system comprising a pair of main windings giving different running speeds and a corresponding pair of starting windings, a pair of control devices responsive to different speeds and corresponding respectively to the starting windings, a source of current, and a double-position switch arranged in one position to connect said source to one of the main windings and to connect with said source one of said starting windings and at least one of said devices in series with each other and in parallel with said one main winding and arranged in its other position to connect said source with the other main winding and with the other starting winding and the other device, said other starting winding and other device being thereby connected in series and in parallel with said other main winding.

6. An alternating current motor system comprising a pair of main windings giving different running speeds and a corresponding pair of starting windings, a pair of control devices responsive to different speeds and corresponding respectively to the starting windings, a source of current, and a double-position switch arranged in one position to connect said source to one of the main windings through one of said devices and to connect with said source one of said starting windings and both of said devices in series with each other and arranged in its other position to connect said source with the other main winding and with the other starting winding and the other device, said other starting winding and other device being thereby connected in series and in parallel with said other main winding.

7. An alternating current motor system comprising low and high speed main windings giving different running speeds and starting windings associated therewith, a first speed-responsive switch having means for limiting its opening and closing movements to a narrow speed range, a second speed-responsive switch having a considerable range of movement, a source of current, and means operable to connect said source either through said second switch to the low speed main winding arranged in parallel with the corresponding starting winding having the first switch in series therewith or alternatively directly to the high speed main winding arranged in parallel with the corresponding starting winding having the second switch in series therewith.

8. An alternating current motor system comprising low and high speed main windings and starting windings associated therewith, a first speed-responsive switch having means for limiting its opening and closing movements to a narrow speed range, a second speed-responsive switch, a source of current, and means operable to connect said source either to the low speed main winding arranged in parallel with the corresponding starting winding having the first switch in series therewith or alternatively directly to the high speed main winding arranged in parallel with the corresponding starting winding having the second switch in series therewith.

9. In a single-phase alternating current motor, the combination including a pair of selectively energizable running windings for producing high and low motor speeds and a pair of selectively energizable starting windings associated with the running windings respectively, and means responsive to the motor speed to prevent energization of the low speed running winding when the motor is running at a speed in excess of the low speed.

10. In a single-phase alternating current motor, the combination including a pair of selectively energizable running windings for producing high and low motor speeds, and means responsive to the motor speed to prevent energization of the low speed running winding when the motor is running at a speed in excess of the low speed.

REX EARL BASSETT, Jr.